United States Patent [19]
Öhman et al.

[11] Patent Number: 6,116,316
[45] Date of Patent: Sep. 12, 2000

[54] DEVICE FOR BENDING A FLAT, ROUND DISC ELEMENT

[75] Inventors: Ove Öhman, Uppsala; Lars Bering, Täby, both of Sweden

[73] Assignee: Toolex Alpha AB, Sundbyberg, Sweden

[21] Appl. No.: 09/169,926

[22] Filed: Oct. 6, 1998

Related U.S. Application Data

[63] Continuation of application No. PCT/SE97/00774, May 12, 1997.

[30] Foreign Application Priority Data

May 13, 1996 [SE] Sweden .................................. 9601815

[51] Int. Cl.[7] .............................. B31F 5/00; B32B 31/00; B65H 29/00
[52] U.S. Cl. ........................ 156/556; 156/580; 156/581; 369/286; 438/457
[58] Field of Search .................................... 156/556, 580, 156/285, 87, 104, 581; 369/286; 438/457

[56] References Cited

U.S. PATENT DOCUMENTS

| | | |
|---|---|---|
| 5,129,827 | 7/1992 | Hoshi et al. ................................ 437/62 |
| 5,284,538 | 2/1994 | Suzuki et al. ............................ 156/154 |
| 5,810,969 | 9/1998 | Marchisseau et al. ................... 156/580 |
| 5,932,042 | 8/1999 | Gensel et al. .............................. 156/74 |
| 5,932,051 | 8/1999 | Mueller et al. .......................... 156/228 |

Primary Examiner—Richard Crispino
Assistant Examiner—Sue A. Purvis
Attorney, Agent, or Firm—Young & Thompson

[57] ABSTRACT

A device for bending a flat, round disc element, especially for forming a widened gap between two adjacent, facing disc elements which are to be glued together, includes a first part for contact with a first portion of the disc element, a second part for contact with a second portion of the disc element. The second, radially outer part is axially movable relative to the first part. A vacuum source is disposed to bend the radially outer portion of the disc element as the second part is retracted.

15 Claims, 2 Drawing Sheets

DEVICE FOR BENDING A FLAT, ROUND DISC ELEMENT

This application is a continuation of international application PCT/SE97/00774 filed May 12, 1997, which designated the United States.

BACKGROUND OF THE INVENTION

The present invention relates to a device for bending a flat, round disc element, especially for forming an enlarged gap between two adjacent, facings disc elements, which are to be glued together.

DESCRIPTION OF THE RELATED ART

Our previous Swedish patent application SE-A-960 1263-8 describes a process and a device for gluing together two disc elements into a digital video disc. The two disc elements are held coaxially facing each other so that a small gap is left between the disc elements, and this gap is to be partially enlarged to allow insertion of a glue application nozzle for applying an adhesive simultaneously on the facing sides of the disc elements at the same time as they are rotated, so that an annular string of glue is formed. According to this previous application it is suggested that the disc elements be held in a partially convex-curved shape to form a radially outwardly widening gap between the disc elements to thereby facilitate insertion of the glue application nozzle therein.

The previous application does not show or describe, however, how the device is to be constructed in detail to perform this task.

SUMMARY OF THE INVENTION

A purpose of the present invention is therefore to suggest a device which solves the problem of creating an enlarged space between the disc elements, where the glue application nozzle can be inserted so that there will be greater precision in the relative positioning of the nozzle and the disc elements.

In its most general form there is suggested for this purpose a device of the type described by way of introduction which is characterized in accordance with the invention by a first means for contact with a first portion of the disc element, a second means for contact with a second portion of the disc element, said first and second means being arranged to be movable relative to each other in a direction transverse to the plane of the disc element which is to be bent, said first and second means being movable relative to each other between a first position, in which the first and second means are arranged to be in contact with the disc element in its flat state, and a second position, in which the first and second means hold the disc element in an at least partially bent state.

In a most preferred embodiment of the device according to the invention, the first means is arranged during bending of the disc element to support a central surface area of one side of the disc element, while the second means is a ring axially movable relative to the disc element, said ring during bending of the disc element being in contact with a radially outer surface area of the same side of the disc element. Preferably there is between the ring and the first means a space which, together with the disc element, the ring and the first means, forms a sealed disc-bending vaccum chamber. When this vacuum chamber is connected to a vacuum source, the radially outer portion of the disc element will be bent as the ring is retracted against the force of a spring, so that the bent portion of the disc element can form a widened gap opening together with an adjacent disc element to thereby create sufficient space to insert a glue application nozzle.

BRIEF DESCRIPTION OF THE DRAWINGS

The invention will be described in more detail below with reference to the accompanying, drawings, in which.

DESCRIPTION OF THE PREFERRED EMBODIMENTS

Figure 1:
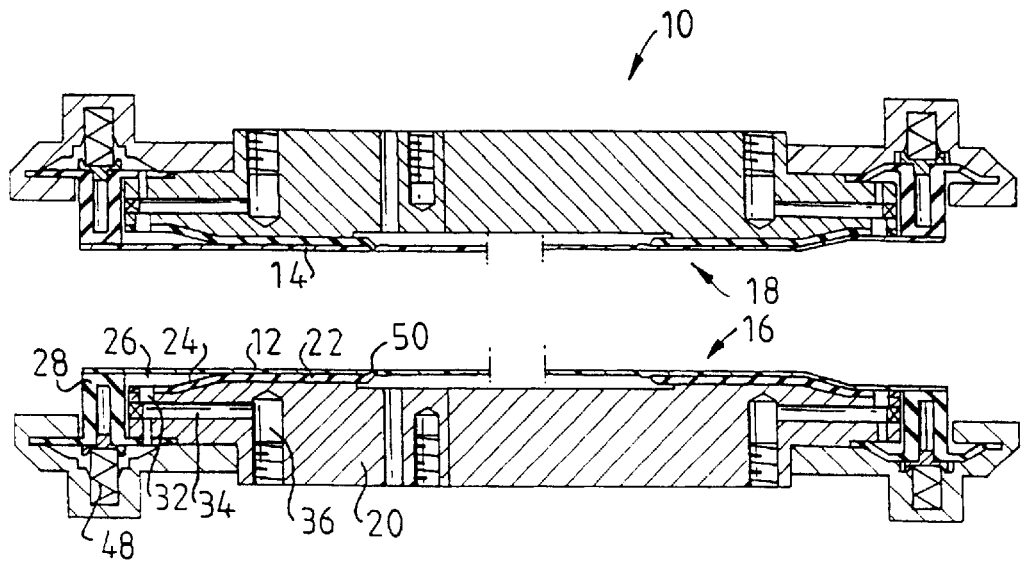
FIG. 1 shows a partially sectioned side view of a unit for gluing together DVD-substrates, which comprises two reflectively oriented disc holders according to the invention to bend a radially outer area of the disc elements. The left-hand halves of the holders as shown in the Figures show the disc element in a phase prior to bending, while the right-hand halves show the disc elements in their bent or curved state.
Figure 2:
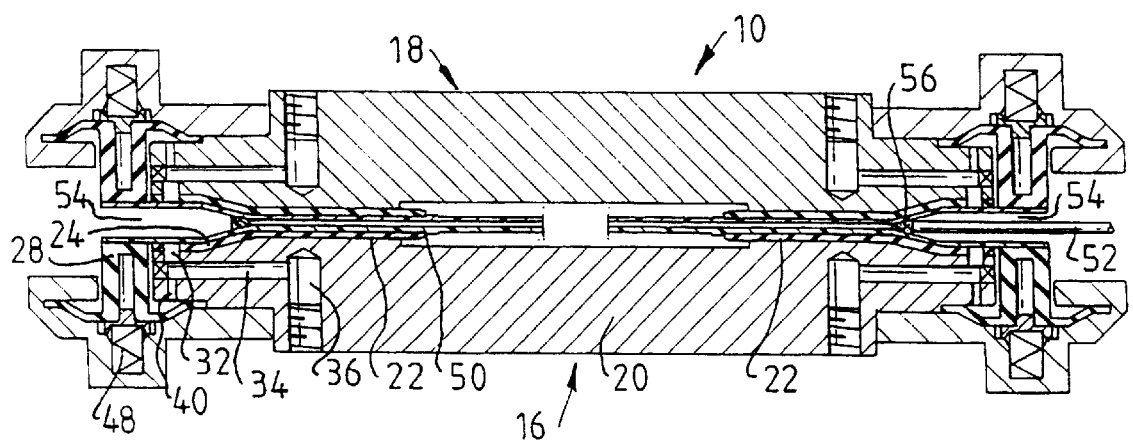
FIG. 2 shows to the right the disc holders moved together with a glue application nozzle inserted in the widened gap obtained by the bending of the disc elements.

The numeral 10 in FIGS. 1 and 2 generally designates a unit for gluing together two thin disc substrates 12,14 into a so-called DVD. The disc elements 12,14 normally have a diameter of circa 120 mm, a thickness of circa 0.6 mm and a central hole with a diameter of circa 15 mm.

The unit 10 in FIGS. 1 and 2 comprises two identical, reflectively arranged disc holders 16,18, and therefore only one 16 of the holders will be described in more detail below. The holder 16 comprises a carrier plate 20 with a disc contact surface 22 of an elastic material. The disc contact surface is depressed at 24 to form an evacuatable chamber 26 for bending a radially outer area of the disc element 12.

Figure 3:
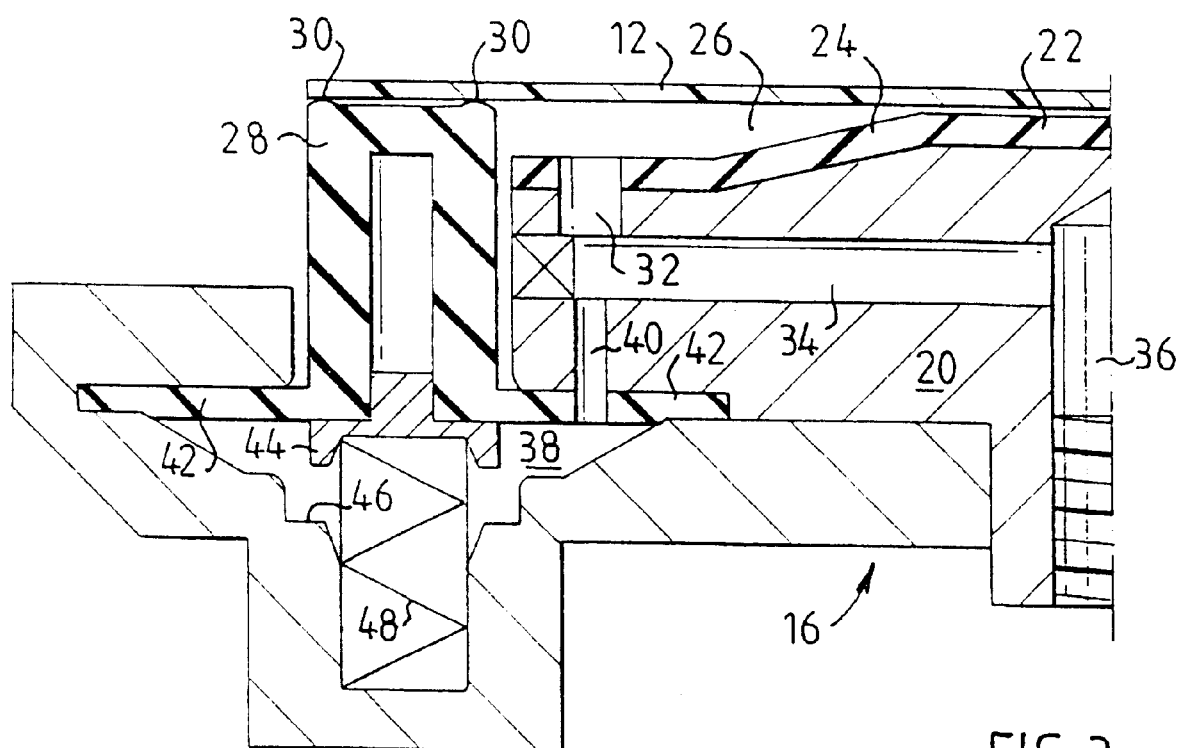
FIG. 3 shows on a larger scale a radially outer portion of the holder according to the invention in cross-section.

At a radially outer portion of the carrier plate 20 there is arranged an annular element 28, which is disposed, with annular sealing lips 30 (FIG. 3) to sealingly lie in contact with the disc element 12. The annular element 28 is axially resiliently mounted between a first position which is shown in FIG. 3 and to the left in FIG. 1, where the annular element 28 is in contact with the disc element 12 in its flat state, and a second, retracted position, which is shown in FIG. 2 and to the right in FIG. 1, in which the radially outer area of the disc element 12 is held bent against the depressed chamber 26. This holding of the radially outer area of the disc element 12 in a bent state is achieved by connecting the chamber 26 to a vacuum source (not shown) via channels 32, 34, 36. A space 38 under the annular element 28 can also be in communication via a channel 40 with the vacuum source in order to facilitate retraction of the annular element 28. The annular element can have a flexible flange 42 and an abutment 44 which, when the annular element is retracted, will abut against a shoulder 46 to limit the retractive movement of the annular element 28. The compressive spring element 48 is disposed to be in contact with the underside of the annular element 28 to bias it towards its extended first position. The disc contact surface 22 of the carrier plate 20 has, as does the annular element 28, at least one annular sealing lip 50 to seal the chamber 26 radially inwards.

FIG. 2 shows the gluing unit 10 in a position where the holders 16 and 18 have been moved together after the flat disc elements 12,14 have been placed against the disc contact surfaces 22 and the annular elements 28 of the holders 16,18, and the vacuum source has been connected to the respective bending chambers 26 via the channels 32, 34 and 36 and to the underside of each annular element 28 via the channel 40. Thus, the disc elements 12,14 are held slightly apart in their central portions and somewhat more separated at the radially outer area to allow a clue application nozzle 52 to be inserted unimpeded into the enlarged gap 50 while the holders 16,18 are rotated, and deposit a circular string of glue 56 at the same time against the facing surfaces of the disc elements 12, 14.

Even if the embodiment of the invention described above is preferable, it is conceivable within the scope of the invention, to arrange the annular element at a radially inner central area of the disc elements. In this case, the glue application nozzle must be inserted radially from within via the existing center hole in one of the disc elements.

It is also conceivable within the scope of the invention, in order to obtain a widened gap between the disc elements, to arrange the annular element fixed and make the disc contact surface of the carrier plate axially movable with the aid of a pressure medium, for example. In this case, however, the disc element is held securely against the annular element with the aid of gripping means which could encroach on the gap space where the glue application nozzle is to be inserted.

What is claimed is:

1. Device for bending a flat, round disc element (12;14), especially for forming a widened gap (54) between two adjacent, facing disc elements (12;14), which are to be glued together, comprising a first means (20) for directly contacting with a first portion of the disc element (12;14), a second means (28) for contact with a second portion of the disc element (12;14), said first and second means (20,28) being arranged to be movable relative to each other in a direciton transverse to the plane of the disc element (12;14) which is to be bent, said first and second means (20,28) being movable relative to each other between a first position, in which the first and second means are arranged to be in co-planar contact with the disc element (12;14) in its flat state, and a second position, in which the first and second means hold the disc element (12;14) in an at least partially bent state having a central portion of the disc element held flat in a first plane and an annular portion of the disc element held flat in a second plane offset from the first plane.

2. Device according to claim 1, characterized in that the first means (20) is stationary and the second means (28) is movable.

3. Device according to claim 2, characterized in that the first means (20) is arranged to support a central surface area of one side of the disc element (12;14) and that the second means (28) is arranged to be in contact with a radially outer surface area of the same side of the disc element (12;14).

4. Device according to claim 2, characterized in that the first means is arranged to support a central surface area of one side of the disc element, and that the second means is arranged to be in contact with a radially inner surface area of the same side of the disc element.

5. Device according to claim 3, characterized in that the second means has the shape of a ring (28) axially movable relative to the disc element (12;14) from said first plane to said second plane.

6. Device according to claim 5, characterized in that the ring (28) is resiliently movable against the force of spring means (48).

7. Device according to claim 5, characterized in that there is defined between the ring (28) and the first means (20) a space (26), which, together with the disc element (12;14), the ring (28) and the first means (20), forms a sealed vacuum chamber.

8. Device according to claim 7, characterized in that the vacuum chamber (26) is connectable to a vacuum source.

9. Device according to claim 7, characterized in that the first means (20) has a radially outer depressed portion (24) which delimits said space (26).

10. Unit for gluing together two disc elements (12,14), especially disc substrates for digital audio, video or computer discs, characterized in that it comprises two devices (16,18) according to claim 1, placed reflectively in relation to each other.

11. Device for bending a flat, round disc element, especially for forming a widened gap between two adjacent, facing disc elements which are to be glued together, comprising:

a first stationary means for directly supporting a central surface area of one of the disc elements; and a second means for contact with a radially outer surface area of said disc element, said second means being arranged to be movable relative to said first means in a direction transverse to the plane of said disc element which is to be bent, said second means being movable between a first position, in which the first and second means are arranged to be in contact with the disc element in a flat state thereof, and a second position, in which the first and second means hold the disc element in an at least partially bent state, and said first and second means being adapted, in said first position of the second means, to form with the disc element a sealed space which is connectable to a vacuum source.

12. Device according to claim 11, wherein the second means has the shape of a ring axially movable relative to the disc element.

13. Device according to claim 12, wherein the ring is resiliently movable against the force of spring means.

14. Device according to claim 12, wherein the first means has a radially outer depressed portion which delimits said space.

15. Unit for gluing together two disc elements, especially disc substrates for digital audio, video or computer discs, comprising two devices according to claim 11, placed reflectively in relation to each other.

* * * * *